(12) United States Patent
Montana et al.

(10) Patent No.: US 10,754,849 B2
(45) Date of Patent: *Aug. 25, 2020

(54) DYNAMIC GATHERING OF SOCIAL MEDIA CONTENT

(71) Applicant: CISION US INC., Beltsville, MD (US)

(72) Inventors: Enrico Montana, Redmond, WA (US); Brian Farrell, Renton, WA (US); Melody Jones, Seattle, WA (US); Chris Hundley, Kirkland, WA (US)

(73) Assignee: CISION US INC., Beltsville, MD (US)

( * ) Notice: Subject to any disclaimer, the term of this patent is extended or adjusted under 35 U.S.C. 154(b) by 1005 days.

This patent is subject to a terminal disclaimer.

(21) Appl. No.: 15/063,392

(22) Filed: Mar. 7, 2016

(65) Prior Publication Data
US 2016/0188657 A1    Jun. 30, 2016

Related U.S. Application Data

(63) Continuation of application No. 14/015,617, filed on Aug. 30, 2013, now Pat. No. 9,852,176, and a continuation of application No. 12/876,087, filed on Sep. 3, 2010, now abandoned.

(51) Int. Cl.
| | |
|---|---|
| *G06F 16/24* | (2019.01) |
| *H04L 29/08* | (2006.01) |
| *G06F 16/28* | (2019.01) |
| *G06F 16/958* | (2019.01) |

(52) U.S. Cl.
CPC ............ *G06F 16/24* (2019.01); *G06F 16/282* (2019.01); *G06F 16/972* (2019.01); *H04L 67/28* (2013.01); *H04L 67/2819* (2013.01)

(58) Field of Classification Search
CPC .................................................. G06F 17/30386
USPC ........................... 707/E17.014, 758; 719/217
See application file for complete search history.

(56) References Cited

U.S. PATENT DOCUMENTS

| | | | | |
|---|---|---|---|---|
| 4,845,645 | A * | 7/1989 | Matin | G09G 1/00 |
| | | | | 715/781 |
| 6,518,219 | B1 * | 2/2003 | Yang | B01J 21/04 |
| | | | | 423/625 |
| 7,713,914 | B2 * | 5/2010 | Farquharson | C12Q 1/04 |
| | | | | 506/7 |
| 7,813,974 | B1 | 10/2010 | Braum et al. | |
| 9,124,650 | B2 | 9/2015 | Maharajh | |
| 2004/0006608 | A1 | 1/2004 | Swarna et al. | |
| 2004/0015497 | A1 * | 1/2004 | Swarna | G06Q 30/04 |
| 2004/0128346 | A1 * | 7/2004 | Melamed | G06F 17/30902 |
| | | | | 709/203 |

(Continued)

*Primary Examiner* — Baoquoc N To
(74) *Attorney, Agent, or Firm* — P.G. Scott Born; Foster Garvey PC

(57) ABSTRACT

Methods, techniques, and systems for gathering social media content are provided. Some embodiments provide a Social Intelligence System ("SIS") configured to provide dynamic search capability of a content source by using a proxy server system as an intermediary between the SIS and the content source. The SIS may then dynamically determine a rate at which it searches for content based on a rate of change or predicted change of a particular content source. Dynamically determining a rate allows the SIS to track a particular topic or series of topics over time, while only searching for content on the topic at the most optimal time periods to reduce overall cost.

20 Claims, 12 Drawing Sheets

(56) References Cited

U.S. PATENT DOCUMENTS

| | | |
|---|---|---|
| 2004/0138970 A1 | 7/2004 | Ramachandran et al. |
| 2009/0319523 A1* | 12/2009 | Anderson ......... G06F 17/30528 |
| 2010/0275128 A1 | 10/2010 | Ward |
| 2011/0225417 A1 | 9/2011 | Maharajh |
| 2011/0279458 A1* | 11/2011 | Gnanasambandam ...................... G06Q 30/0238 345/440 |
| 2012/0078719 A1 | 3/2012 | Bhagwan |
| 2012/0179752 A1 | 7/2012 | Mosley |

* cited by examiner

DYNAMIC GATHERING OF SOCIAL MEDIA CONTENT

PRIORITY CLAIM

This application claims priority to and the benefit of U.S. patent application Ser. No. 14/015,617 filed Aug. 30, 2013, which application claims priority to U.S. patent application Ser. No. 12/876,087 filed Sep. 3, 2010, each of which are hereby incorporated by reference in its entirety.

BACKGROUND OF THE INVENTION

The present disclosure relates to methods, techniques, and systems for gathering social media content and, in particular, to methods, techniques, and systems for using dynamic search techniques to minimize cost when searching third party content sources Many successful social media sources are provided free to consumers. Using a generally known revenue model, these same sources attempt to sell information about their users to a variety of companies in order to gain revenue. For example they may sell information to advertisers to enable targeted marketing.

Because of the vast amounts of public data on sources like Facebook and Twitter, the cost to buy this data tends to be exorbitant, which is limiting to a lot of businesses. To circumvent such costs, businesses looking to access this data have used means such as accessing the source itself, using the source's application programming interface or using a web search to access a subset of the data at no charge. In order to prevent such free access, some sources monitor these searching means by limiting the number of times a particular IP address can search the source in a given day, thereby encouraging the purchase of the data directly from the site.

Even when a consumer chooses to purchase the data from the site, this data may be stale and is generally focused on historical data, not on the current real time flow of data. However, the content sources have not seen a need to provide data in real time, as it is far more costly than daily content transfers or using slow crawling search technologies. Content sources that provide data in real time generally only provide the most recent content and limit the amount of historical content available. Also, it is not within the interests of a source provider to offer subsets of the data, because requiring a business to purchase all of the data leads to a better profit model.

Accordingly, in some cases a purchaser must pay for an entire set of data when the purchaser only wants access to a miniscule or smaller portion. In other cases a subset of the data is available for purchase but that subset is only offered once or twice a day, which in some cases is far too slow. Further, these subsets are at times incomplete and consumers cannot necessarily guarantee quality of coverage of particular content unless they purchase the entire set. In yet other cases, when real time data is available, access to historical data is severely limited. Other methods of access include costly pay per search proxy server services.

DETAILED DESCRIPTION

Figure 1:
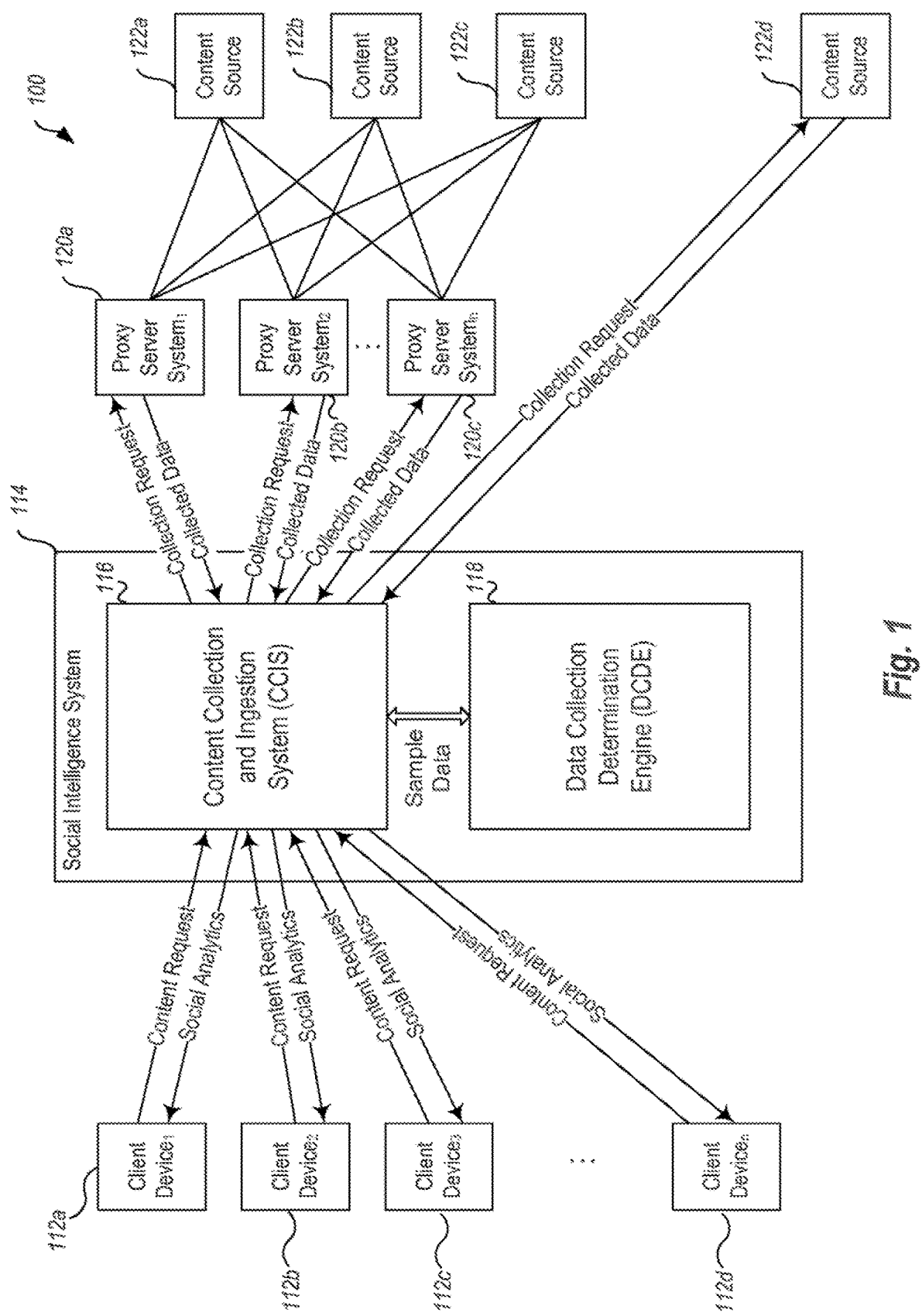
FIG. 1 is an example block diagram of example components of an example social media gathering environment.

Embodiments described herein provide enhanced computer- and network-based methods, systems, and techniques for gathering real-time or near real-time social media content. Example embodiments provide a Social Intelligence System, which enables users to gather social media content from a plurality of content sources. In some embodiments, content is gathered directly from content sources. In other embodiments, proxy server services are used. Social media content may include, for example, blog posts, social networking feeds, update messages, videos and/or other generated media accessible over a network, or the like. Optional use of the proxy server service allows a requester to generate multiple searches using multiple IP addresses, effectively "spoofing" the requester, thereby avoiding the content sources ability to block any particular IP address. In example embodiments, the Social Intelligence System allows a user with a client device to search for social media content and receive social analytics based upon such content. In addition, the Social Intelligence System facilitates the cost effective search of a content source by advantageously dynamically adjusting an associated collection time period between searches, to ensure real time or near real time data without the need to use costly proxy server services more than necessary to ensure real-time content, while still optionally storing related historical content.

In example embodiments, achieving cost effective, near real time content gathering is obtained by determining, approximating, or predicting the rate that new data is being posted to a content source on a topic by determining a duplication rate and dynamically adjusting the time period between searches based on that duplication rate. The duplication rate may be used to predict the rate at which new content is added to a particular content source. For example, a topic relating to a coffee house will likely see an increase in rate of posts during a peak time period (morning) and see a decrease in the rate of posts during an off peak time period (evening). Thus, it may be more economical to allow the system to increase and decrease associated collection time period based on the rate of change. In some embodiments, the associated collection time period or time of day may result in searching in different geographic locations or on different types of social media. The associated collection time period may be adjusted dynamically as results are returned based on the rate of new content on a content source, which may be predicted by a duplication rate of posts.

Example Social Intelligence Systems may include a client device (e.g., computer, portable computer, mobile computing device, and/or any device capable of wired or wireless connection to a network), from which it receives requests for content (e.g., a keyword, keywords, picture, video, link, content source, and/or any other indication of content) viewable in the form of social analytics (e.g., charts, trends, individual posts, etc.). The Social Intelligence System may communicate with a proxy server service, which forwards a collection request, typically based upon the client device's content request, to a content source. For purposes herein, a proxy server service may be, for example, a server bank, a set of proxy servers, a computing device, a portion of a computing devices, a service, a pass through service, a system configured to spoof an IP address, and/or any service or group of computing devices capable of initiating a search and having multiple IP addresses. In some embodiments, the proxy server service may be an anonymizer and/or a repeater. In some embodiments, the proxy server service may be internal to the Social Intelligence System, whereas in other embodiments the proxy server service may be external to and in data communication with the Social Intelligence System. The Social Intelligence System may also communicate directly with the content source. Upon receipt of collected data resulting from the collection request, the Social Intelligence System determines a duplication rate and updates the collection time period (e.g., a clock time, an interval, absolute time, relative time, and/or a frequency) associated with a particular collection request.

The techniques of gathering social media content may be useful to create a variety of content search and gathering operations where each search has a related cost either in currency or in resources. In particular, the systems, methods, and techniques described herein may be used in web searching, advertising, social media manipulation and any system or method that would benefit from a low cost anonymous access to content.

FIG. 1 is an example block diagram of example components of an example social media gathering environment. In particular, FIG. 1 depicts an example social media gather environment ("SMG Environment" or "SMGE") 100 that includes a Social Intelligence System ("SI System" or "SIS") 114 (e.g., a code module/component), a plurality of client devices 112a-d that provide indications of a content request (e.g., a keyword, keywords, picture, video, link, content source, and/or any other indication of content), one or more proxy server systems 120a-c, and one or more content sources 122a-c (e.g., blog posts, social networking feeds, update messages, videos, Twitter™, Facebook™, Google™ Blogs, Technorati™, Flickr, Google™ News, Google™ Video, YouTube™, Google™ Buzz, RSS feeds, and/or other generated media accessible over a network). The components of the illustrated SMGE 100 provide various logic (e.g. code, instructions, functions, routines, etc.) and/or services related to the near real time gathering of data from content sources through the optional use of intermediary proxy server services or other computing systems. The SIS 114 controls the gathering of data. In particular, the SIS 114 provides functions relating to the overall management of the SMGE 101, such as controlling content requests from a client device and managing collection requests to/from one or more proxy server systems 120a-c or to/from the content sources 124a-d. For example, the SIS 114 may receive a content request from client devices 112a-d having an indication of content to be searched as well as an indication of at least one content source where the search is to occur. In addition, the SIS 114 may provide other capabilities, such as providing analytics, providing content suggestions, processing payments, and/or other administrative tasks related to the implementation of the SMG Environment 100.

The SIS 114 comprises a content collection and ingestion system ("CCI System" or "CCIS") 116 and a data collection determination engine ("DCD Environment" or "DCDE") 118. The CCIS 116 is configured to receive content requests from the client devices 112a-d and to configure and transmit (e.g. forward, send, communicate, etc.) collection requests through one or more proxy server systems 120a-c or directly to the content sources 124a-d. In order to gather content from the content sources 122a-c in the form of collected data (e.g., a screen scrape, a copy of text, a link, and/or a piece of social media accessible over a network). The CCIS 116 may transmit the collection request one time or multiple times. A collection request in some embodiments may be identical to a previous collection request, contain the same keywords in different order, contain related words, and/or have a similarity to a previous collection request. In order to maximize knowledge gained regarding the change of the content over time, a collection request is run consistently over a period of time. In one embodiment, the SIS 114 is advantageously configured to monitor content over time, by optimally adjusting a time period in between same or similar content requests.

The DCDE 118 samples the collected data as it is received by the CCIS 116 to determine a duplicate or overlap rate. A duplicate or overlap rate may be one of many predictors of the rate of new content on a particular source. Other such predictors may include time period between distinct content in a content source (length of time between a first piece of content and a second piece of content), range of dates in the content. In one embodiment, the duplicate rate is the rate at which received content matches previously stored content. For example, if received data matches 80% of the data already stored (e.g. previously collected data), then the rate at which new content is being added to the source is likely decreasing and thus should be less frequently searched. In some embodiments, the DCDE 118 may be part of the CCIS 116 or implemented as a third party service. The DCDE 118 may interact with the CCIS 116 to attach an associated collection time period to a collection request. The associated collection time period provides the CCIS 116 with a time period, that when elapsed, causes the CCIS 116 to perform another search of the content sources 122a-c as specified in the associated collection request. The associated time period or the associated collection time period may be defined as a time, an absolute time, a relative time, a clock time, a frequency, an interval, or as any other relating timing construct. In some embodiments, the DCDE 118 may detect a rapid increase in content and provisionally increase the rate/time period in which the collection request is repeated, as a precaution to prevent missing new content. In some embodiments, the DCDE 118 may adjust the associated collection time period based on topic, time of day, geographic location, etc.

In some embodiments the DCDE 118 may use a social velocity or a social momentum index (or other index or rate) to determine an associated collection time period. In some embodiments, social velocity allows stand-alone and comparative analytics between brands, persons or concepts to predict future behavior on a particular content source. In addition, the measures provided through social velocity can be comparative across disparate time periods to allow a brand, person or concept to measure a rate of new content against a historical event. Social velocity may also be used to compare a rate of new content in new concepts to a rate of new content in historical concepts. Social velocity can thereby be leveraged to predict the rate of new content on (or particular content) particular source.

In some embodiments, a social velocity index may be derived using the following example formula:

$$\Sigma\{[mi/(\text{PublishDT}_{max}-\text{PublishDT}_{min})]\}$$

where, i=individual media
$m_i$=Number of posts
PublishDT$_{max}$=Latest date in the range of posts
PublishDT$_{min}$=Earliest date in the range of posts Note that although FIG. 1 depicts particular data flows, such data flows may occur with varying levels of indirection in other embodiments. For example, the collection request from the CCIS 116 may be forwarded directly to the content sources 122a-c without the use of the proxy server systems 120a-d.

Figure 2A:
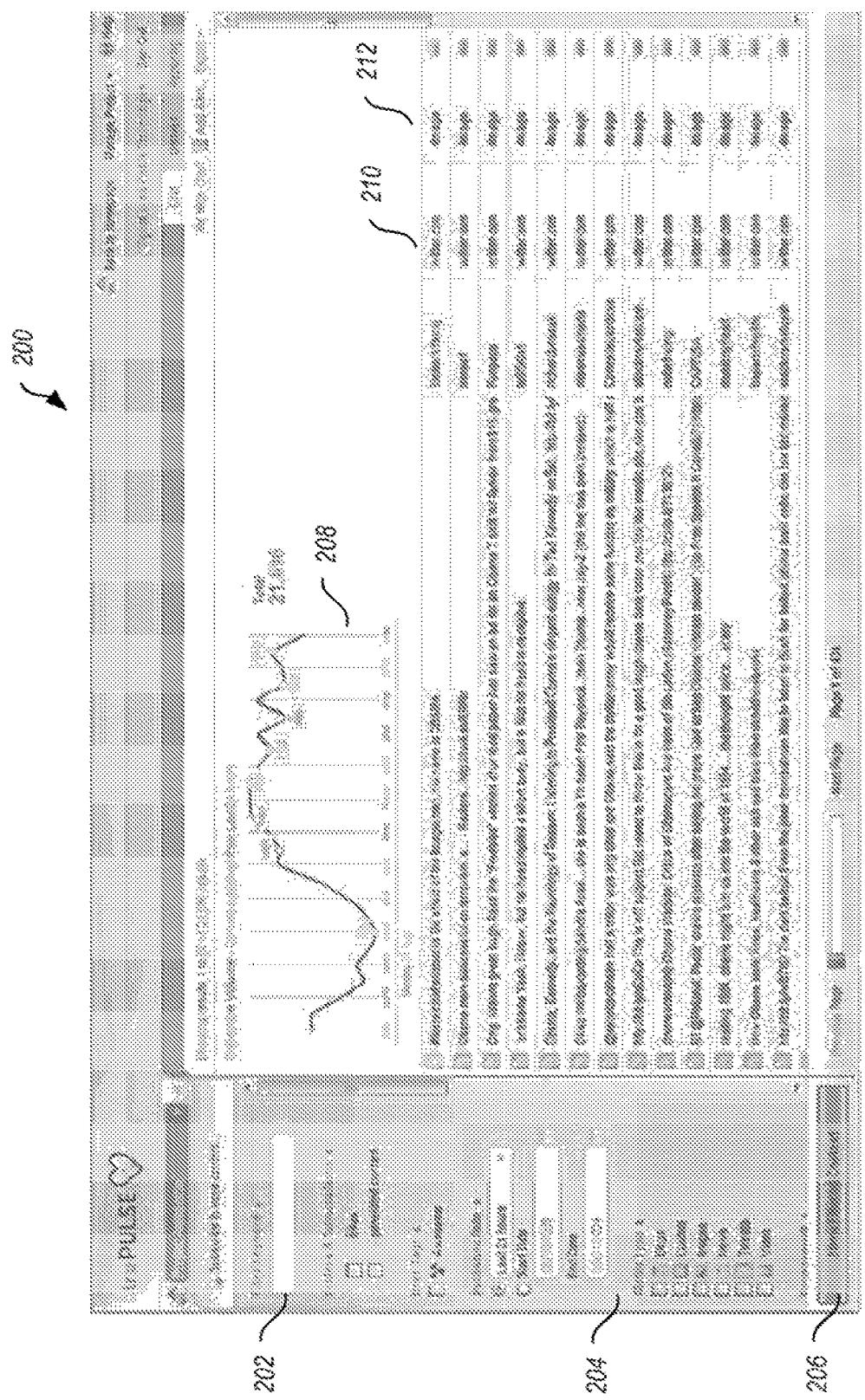
FIGS. 2*a*-2*c* are example screen displays illustrating example aspects of example social media gathering processes.
Figure 2B:
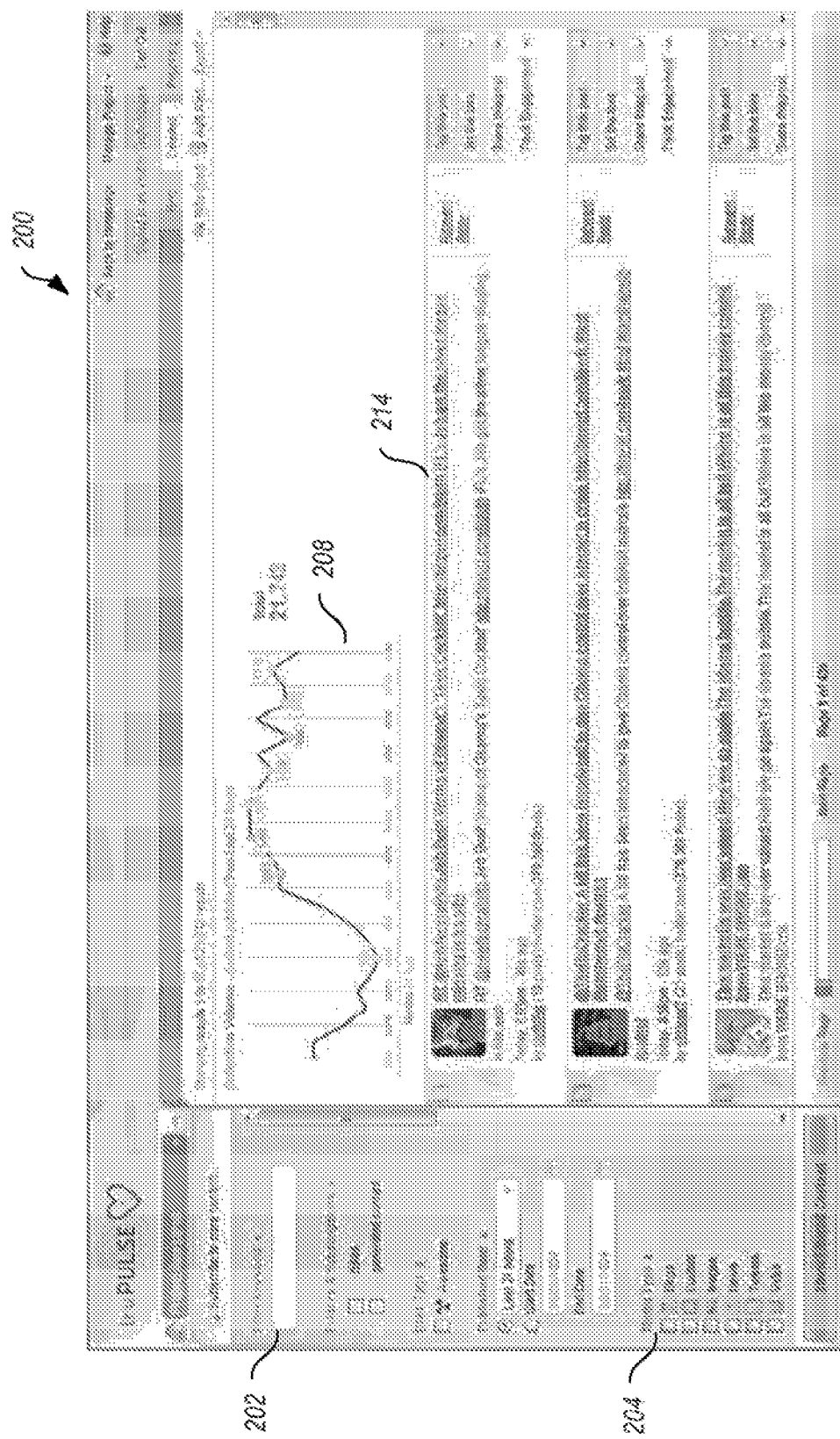
Figure 2C:
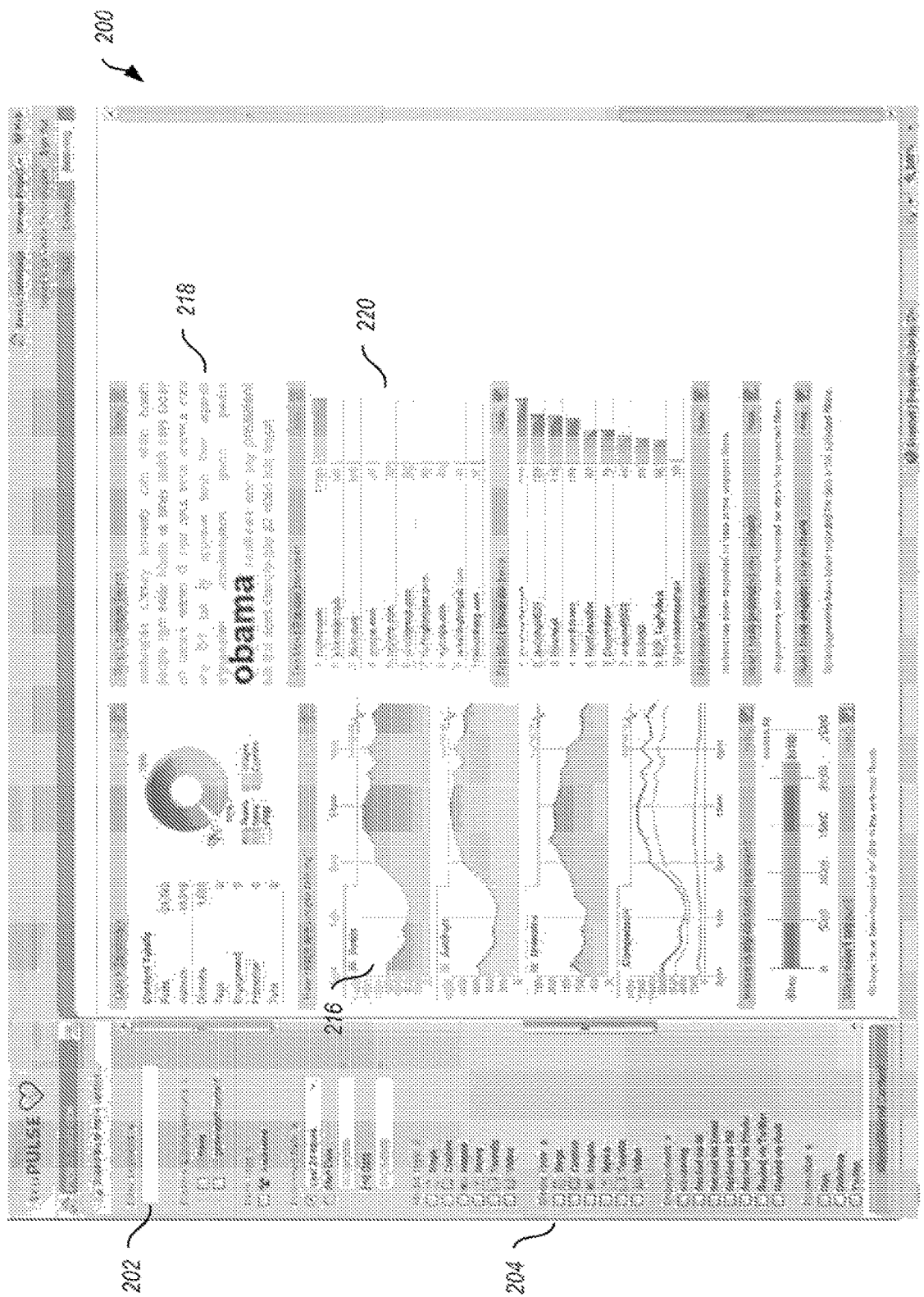

FIGS. 2a-2c are example screen displays illustrating example aspects of example social media gathering processes. FIG. 2a depicts a user interface 200 that is an interface for interacting with a Social Intelligence System, such as the SIS 114 of FIG. 1. The Interface 200 includes an input control 202, configured to receive indications of content (such as keywords) to be searched. The interface 200 includes a content source selector 204, which, in this example, is a plurality of check boxes, but could also be or use any other selection techniques such as radio buttons or a dropdown selection box. The content source selector 204 is used to select one or more content sources such as content source 122 of FIG. 1. A Button 206, when selected, is configured to send the content request to the Social Intelligence System. Again, other user interface controls may be substituted for the controls 202, 204, and/or 206.

The user interface 200 is used to specify content requests and display results. The content request includes the at least one content source to be searched as well as an indication of content to be searched. In response to these requests, social analytics are returned to the user interface 200. Social analytics may take any form such as the form illustrated in chart 208, a list of posts by source 210, and may include a time 212. Analytics, such as those shown in the chart 208, can optionally show a volume of collection by time as shown in this example, or may show a variety of other analytics such as tone of posts, author of posts, etc. In some embodiments the input control 202, allows a user to filter (not shown) previously search content and/or the social analytics. By entering keywords into the input control 202, a subset of posts 210 are shown. In addition, a user can limit the sources of the content by using the content source selection 204.

FIG. 2b shows an alternate embodiment of the user interface 200, which provides more detailed post information 214.

FIG. 2c shows other types of returned analytics, including social analytics 216, 218, 220. The Social Analytics 216, 218, 220 include a summary, volume of posts by authors, domains etc., common related terms, vocal authors, popular domains, tone, engagement, promotion levels, etc. As stated above in order to track these varying analytics, real time or near real-time searching is desirable at the lowest possible cost.

Figure 3:
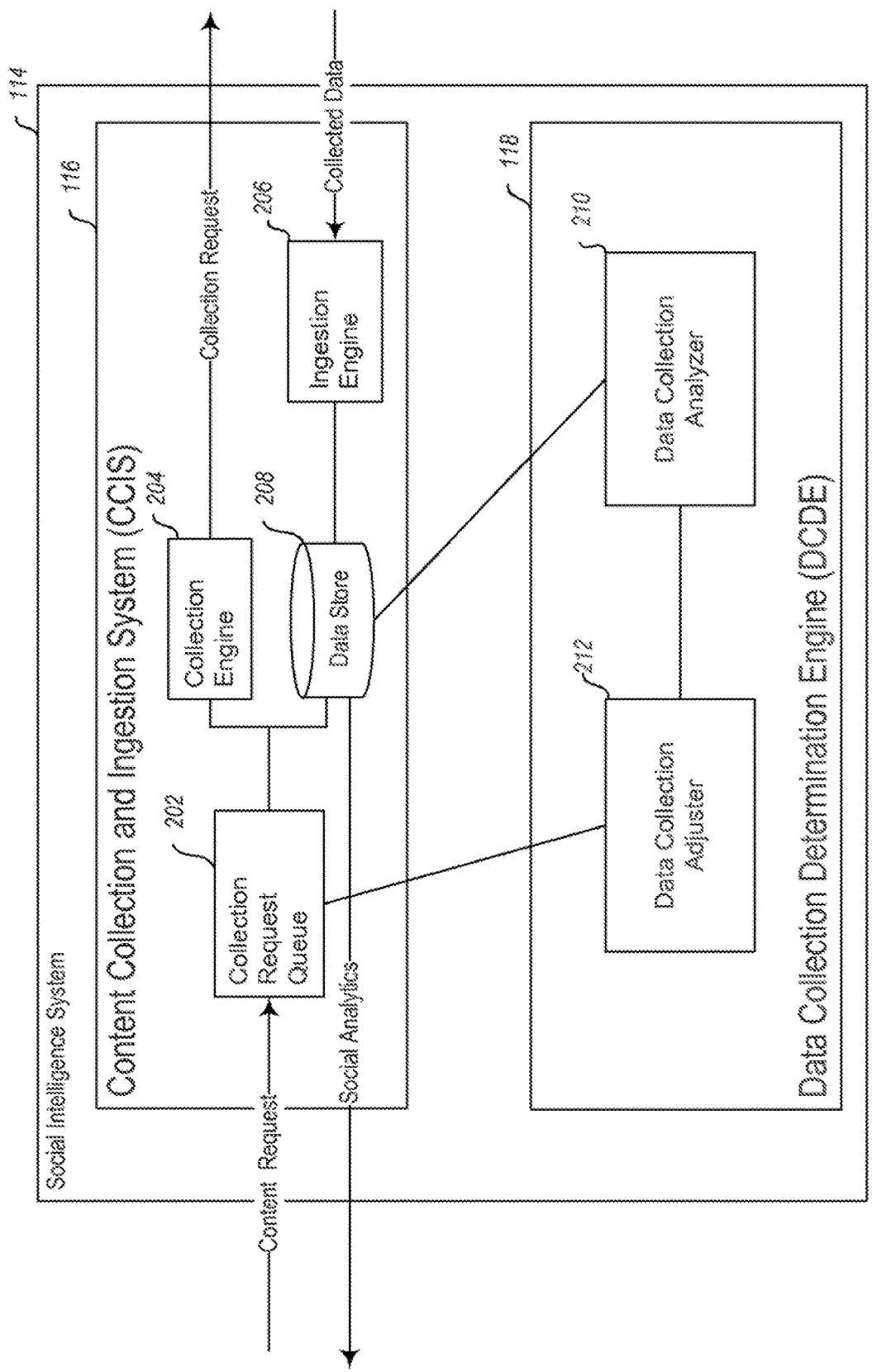
FIG. 3 is an example block diagram of example components of an example Social Intelligence System.

FIG. 3 is an example block diagram of example components of an example Social Intelligence System 114. In one example embodiment, the Social Intelligence System 114 comprises one or more functional components/modules that work together to gather social media content. These components may be implemented in software or hardware or a combination of both. The Social Intelligence System ("SIS") 114, includes a Content Collection and Ingestion System ("CCIS") 116 and a Data Collection Determination Engine ("DCDE") 118 as mentioned with respect to FIG. 1. The CCIS 116 includes a content request queue 202, a collection engine 204, an ingestion engine 206, and a data store 208. The content request queue 202 receives a content request in the form of an indication of content to be searched and an indication of at least one content source to be searched. The queue 202, manages each of these requests, and when an associated time period expires the collection engine 204 pulls the collection request off of the queue 202. In alternate embodiments, the queue 202 transmits a collection request based on the content request to the collection engine 204 for searching. The collection engine 204 is configured to receive the collection request from the queue 202 and to provide the collection request to a source such as a proxy server service or a third party content source. In some embodiments, the collection engine 204 takes the form of a web crawler search engine. The ingestion engine 206 receives and indexes collected data from content sources directly or via a proxy server service or other third party sources. The ingestion engine 206 may also receive content from non-public or semi-public sources, including subscription-based information services, access-controlled social networks, and the like. The ingestion engine 206 provides content information, including data included within content items (e.g., text, images, video) and meta-data about content items (e.g., author, title, date, source) or a subset of either to a data store 208. The data also may be provided directly to a client device in alternate embodiments. The data store 208, is configured to store ingested collected data and provide the data in the form of social analytics (or in other forms) to a client device when requested. One such example of collection and ingestion techniques is described in detail in U.S. Pat. No. 7,720,835, filed May 7, 2007, and entitled "SYSTEMS AND METHODS FOR CONSUMER-GENERATED MEDIA REPUTATION MANAGEMENT," which is incorporated herein by reference in its entirety.

The DCDE 118 includes a data collection analyzer 210 and data collection adjuster 212. The data collection analyzer 118 is configured to sample data from the data store 208 to determine an overlap rate of received and ingested data compared with stored data. In particular, the data collection analyzer 118 samples data as it is input into the data store and tracks the amount of duplicate data. In order to determine if there is duplication, received content can be compared to stored content by comparing one or more of the following: permalinks, content, time, date and/or author, and the like. In some embodiments, the data collection analyzer 210 receives an overlap or duplication rate from the CCIS 116 or another source configured to determine a duplication rate resulting from a collection request. The data collection adjuster 212 receives the duplication rate from the data collection analyzer 210 and, using the duplication rate, determines an associated collection time period. The associated collection time period determines when the collection request will again be released by the collection request queue 202 or pulled by the collection engine 204. In a typical embodiment, the associated collection time period is associated with a particular collection request containing a particular indication of content and a content source to be searched (no matter how the request was generated). The collection request is configured to continually be released by the collection request queue 202 when the associated collection time period elapses (e.g. every 15 seconds). In an embodiment, the data collection adjuster 212, based on the overlap or duplication rate, accesses a data structure (such as the table described below in FIG. 10) to determine an associated collection time period.

In some embodiments, the data collection adjuster 212 may use predictive modeling to update an associated collection time period. Predictive modeling may include input data from exogenous sources such as world events, weather, season, time of year, politics, and/or the like and then optionally using the input data to predict changes in the rate of new content in content sources. For example, predictive modeling may be used to decrease the associated collection time period when a collection request is related to a major natural disaster. The decrease in the associated collection time period would be in anticipation of an increase in the rate new content that will be added to a content source based on the occurrence of the natural disaster.

Figure 4:
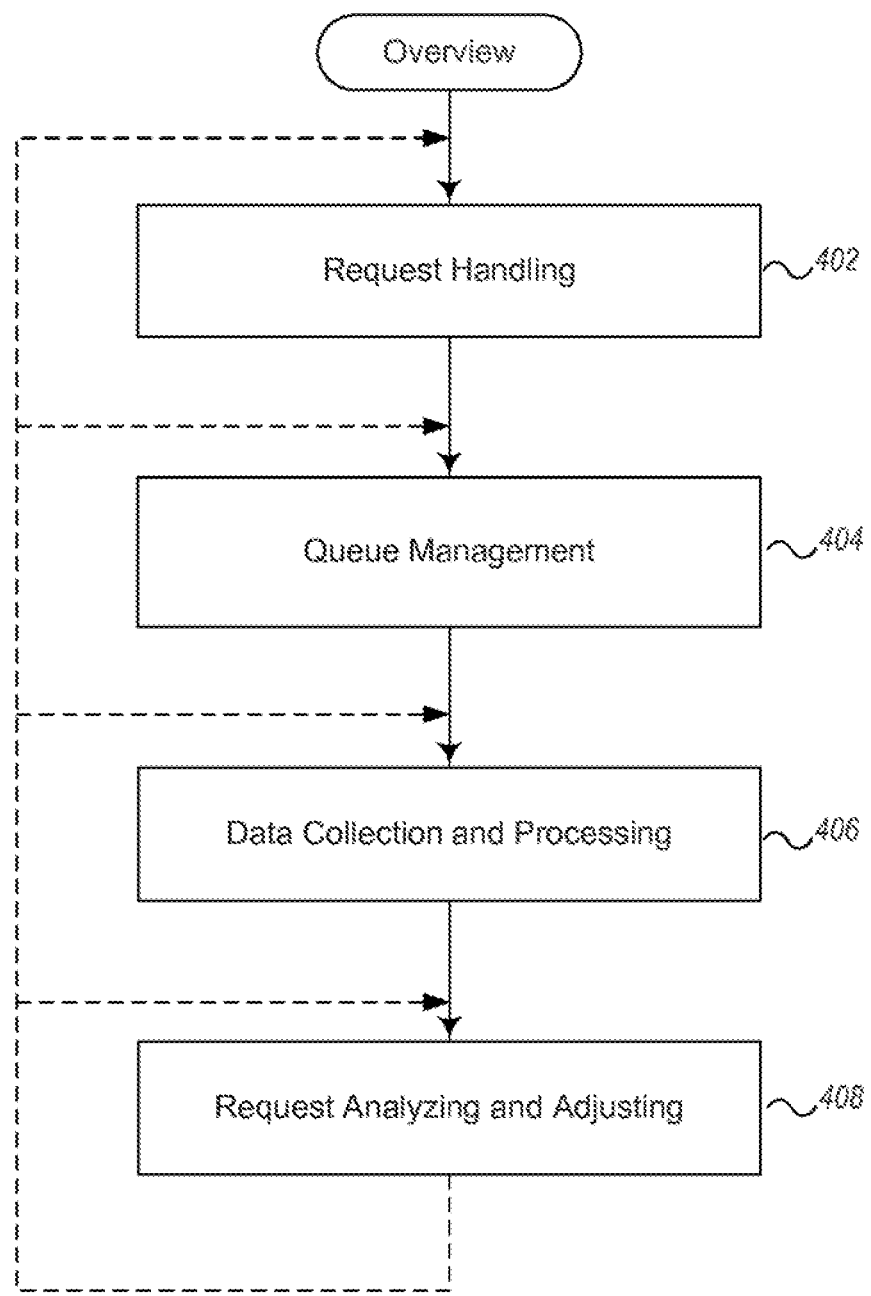
FIG. 4 is an example overview flow diagram of an example Social Intelligence System.

FIG. 4 is an example overview flow diagram of an example Social Intelligence System. FIG. 4 illustrates an overview of the operation of an example Social Intelligence System such as SIS 114 shown with reference to FIG. 1. At block 402, the SIS handles a request. The request may take the form of a content request from a client device or an ongoing collection request stored within a queue. Particular details of some embodiments relating to the handling of requests are further described with reference to FIG. 6. At block 404 the queue is managed. Managing the queue includes monitoring for new content/collection requests and providing them for data collection and processing. Particular details of some embodiments relating to the handling of requests are further described with reference to FIG. 7. At block 406 data collection and processing includes the collection of data from content sources either directly or through proxy server services (or other services) and processing/ingesting the data. Particular details of some embodiments relating to data collection and processing are further described with reference to FIG. 8. At block 408, collection requests are analyzed and adjusted to determine if a collection request needs to be executed more frequently or less frequently enough. Particular details of some embodiments relating to request analyzing and adjusting is further described with reference to FIG. 9. The operation described with reference to FIG. 4 is iterative in nature. After block 408, the process loops back to block 402 or any other block shown.

Although the techniques of the Social Intelligence System are generally applicable to any type of searching of online content, the concepts and techniques described are applicable to other internet searching, including other types of content collection and ingestion. Essentially, the concepts and techniques described are applicable to any data collection environment. Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement a Social Intelligence System to be used for near real time collection of data. Other embodiments of the described techniques may be used for other purposes. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

Figure 5:
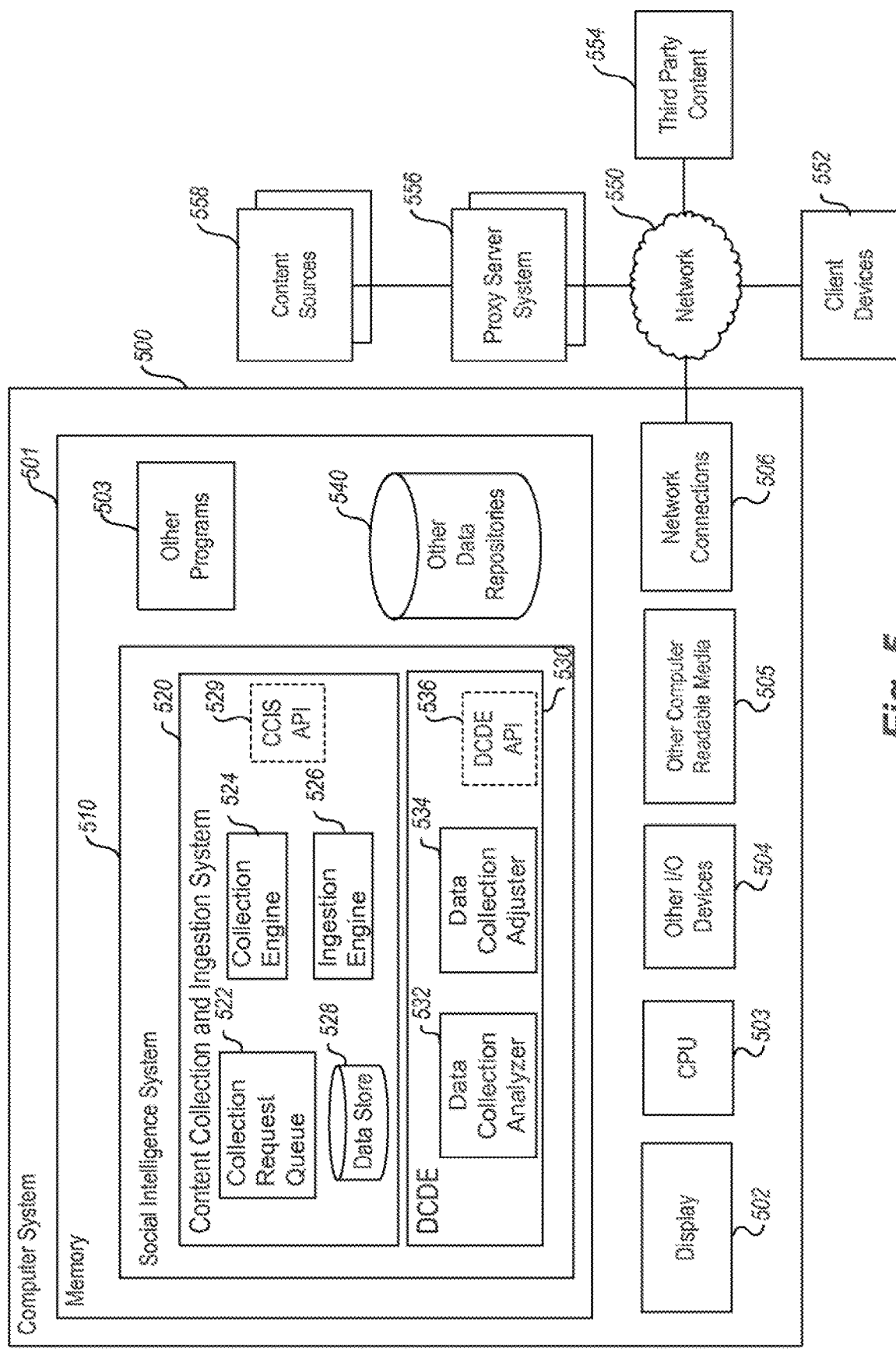
FIG. 5 is an example block diagram of an example computing device for practicing embodiments of a Social Intelligence System.

FIG. 5 is an example block diagram of an example computing device for practicing embodiments of a Social Intelligence System. In particular, FIG. 5 shows a computing system 500 that may be utilized to implement a Social Intelligence System 510. Note that one or more general purpose or special purpose computing systems/devices may be used to implement the Social Intelligence System 510. In addition, the computing system 500 may comprise one or more distinct computing systems/devices and may span distributed locations. Furthermore, each block shown may represent one or more such blocks as appropriate to a specific embodiment or may be combined with other blocks. Also, the Social Intelligence System 510 may be implemented in software, hardware, firmware, or in some combination to achieve the capabilities described herein.

In the embodiment shown, computing system 500 comprises a computer memory ("memory") 501, a display 502, one or more Central Processing Units ("CPU") 503, Input/Output devices 504 (e.g., keyboard, mouse, CRT or LCD display, and the like), other computer-readable media 505, and network connections 506. The Social Intelligence System 510 is shown residing in memory 501. In other embodiments, some portion of the contents, some or all of the components of the Social Intelligence System 510 may be stored on and/or transmitted over the other computer-readable media 505. The components of the content recommendation system 510 preferably execute on one or more CPUs 503 and extract and provide quotations, as described herein. Other code or programs 530 (e.g., an administrative interface, a Web server, and the like) and potentially other data repositories, such as data repository 520, also reside in the memory 501, and preferably execute on one or more CPUs 503. Of note, one or more of the components in FIG. 5 may not be present in any specific implementation. For example, some embodiments may not provide other computer readable media 505 or a display 502.

In a typical embodiment, as described above, the Social Intelligence System 510 includes a Content Collection and Ingestion System ("CCIS") 520 and a Data Collection and Determination Engine ("DCDE") 530. The CCIS 520 includes a collection request queue 522, collection engine 524, an ingestion engine 526, and a data store 528. The CCIS performs functions such as those described with reference to the CCIS 116 of FIG. 3. For example, the CCIS 520 receives content requests and then obtains content items, such as Web pages, Blog postings, videos, audio files, and the like from various content sources 558 via network 550, and stores information about the obtained content items in the data store 528, for use by other components, such as the DCDE 530.

The DCDE 530 performs functions such as those described with reference to the DCDE 118 of FIG. 3. The DCDE 118 analyzes received content using the data collection analyzer 532 and compares it to content stored in the data store 528 to identify an overlap or duplication rate between them. De-duplication functionality may also be included within the ingestion engine 526 or collection engine 524 to ensure duplicate data is not stored in the data store 528. The data collection analyzer 532 receives the duplication rate from the data collection adjuster 534 and sets an associated collection time period for each such collection request in the future. The associated collection time period is then used to determine when the next associated collection request is released from the collection request queue 522.

The Social Intelligence System 510 interacts via the network 550 with (1) one or more proxy server systems 556 which in turn interacts with the content sources 558, (2) with third-party content 554 and/or (3) client devices 552. The network 550 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The client devices 552 include desktop computing systems, notebook computers, mobile phones, smart phones, personal digital assistants, and the like.

Other or additional functions and/or data are contemplated. For example, in some embodiments, the Social Intelligence System 510 includes additional collection request adjustment mechanisms, such as the ability to select proxy server systems 556 based on time, geographic location, and use levels over a given period and the like. In other embodiments the SIS 510 may adjust collection requests to ensure a plurality of collection requests are spread out over time to ensure not all collection requests are running at the same time resulting in drained resources.

In an example embodiment, components/modules of the Social Intelligence System 510 are implemented using standard programming techniques. For example, the Social Intelligence System 510 may be implemented as a "native" executable running on the CPU 503, along with one or more static or dynamic libraries. In other embodiments, the Social Intelligence System 510 may be implemented as instructions processed by a virtual machine that executes as one of the other programs 503. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the Social Intelligence System 510, such as in the CCIS API 529 and the DCDE API 536, can be made available by standard mechanisms such as through C, C++, C#, and Java APIs; libraries for accessing files, databases, or other data repositories; through languages such as XML; or through Web servers, FTP servers, or other types of servers providing access to stored data. The data store 528 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the Social Intelligence System 510 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 6:
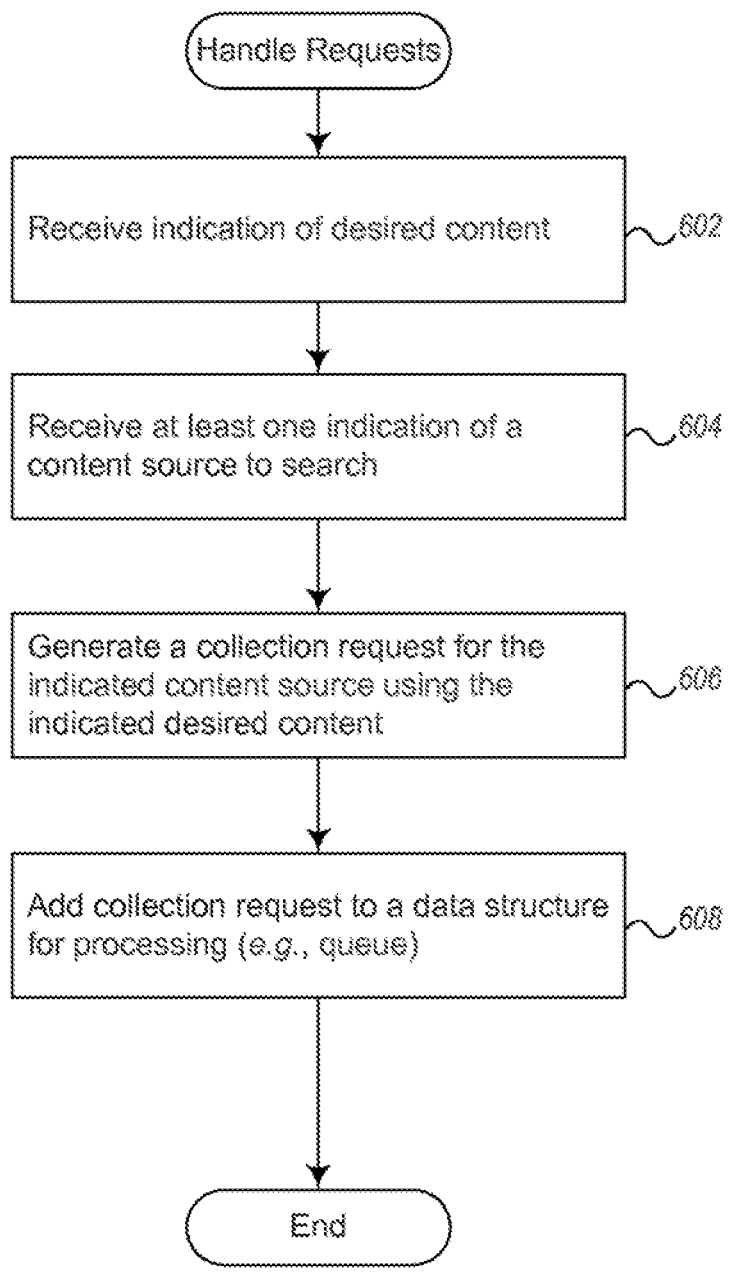
FIG. 6 is an example flow diagram of example request handling logic provided by an example embodiment of a Social Intelligence System.

FIG. 6 is an example flow diagram of example request handling logic provided by an example embodiment of a Social Intelligence System. In particular, FIG. 6 illustrates a process that may be implemented by, for example, one or more elements of the Content Collection and Ingestion System 118, such as the Collection Request queue 202 as described with reference to FIG. 3. The process handles content requests from a client device.

The illustrated process begins at block 603, where it receives an indication of desired content. The received indication may identify content, such as may be found on a remote web server or other content source, such as one of the content sources 122 and described with reference to FIG. 1.

At block 604, the process receives at least one indication of a content source to search. At least one content source is generally received; however multiple content sources may be received and searched simultaneously. In some embodiments, there exists a default one or more content sources that would be searched if the system does not receive an indication of a content source to search.

At block 606, a collection request is generated (e.g., built, configured, provided, etc.) for the indicated content source using the indicated desired content. A collection request may be specified in the format of the interface of the content source, an application programming interface, a text string, or a form usable to search a content source such as those described with reference to content sources 122 and shown in FIG. 1. In one embodiment a collection request includes, an indication of desired content, possibly formatted for a particular content source, and an associated time period for searching. The collection request further may include a length the search is to be run (e.g. a number of days, number of iterations, and/or the like), an end time for the search, and/or a geographic preference for the search. In some embodiments the collection request may include an indication of desired content as well as multiple content sources to be searched.

At block 608, the generated collection request is added to a data structure for processing. The data structure is configured to store a collection request and may take the form of a queue, a buffer, or the like. The collection request is placed in the data structure until a collection engine, such as the collection engine 204, as previously described with respect to FIG. 3, processes a collection request or until a time period associated with the collection request elapses. When a content request is first placed in the data structure in the form of a collection request it is assigned an associated time period for search. In some embodiments an initial search using the collection request happens immediately and an associated collection time period is set based on the systems and methods described herein.

After block 608 the process performs other processing and/or ends.

Some embodiments perform one or more operations/aspects in addition to, or instead of, the ones described with reference to the process of FIG. 6. For example, in one embodiment, the process includes a loop that repeatedly receives and processes requests, so as to perform bulk searches using multiple indications of desired content and multiple content sources. In another embodiment, the process of FIG. 6 is invoked in an on-demand manner in response to a received user interface request.

Figure 7:
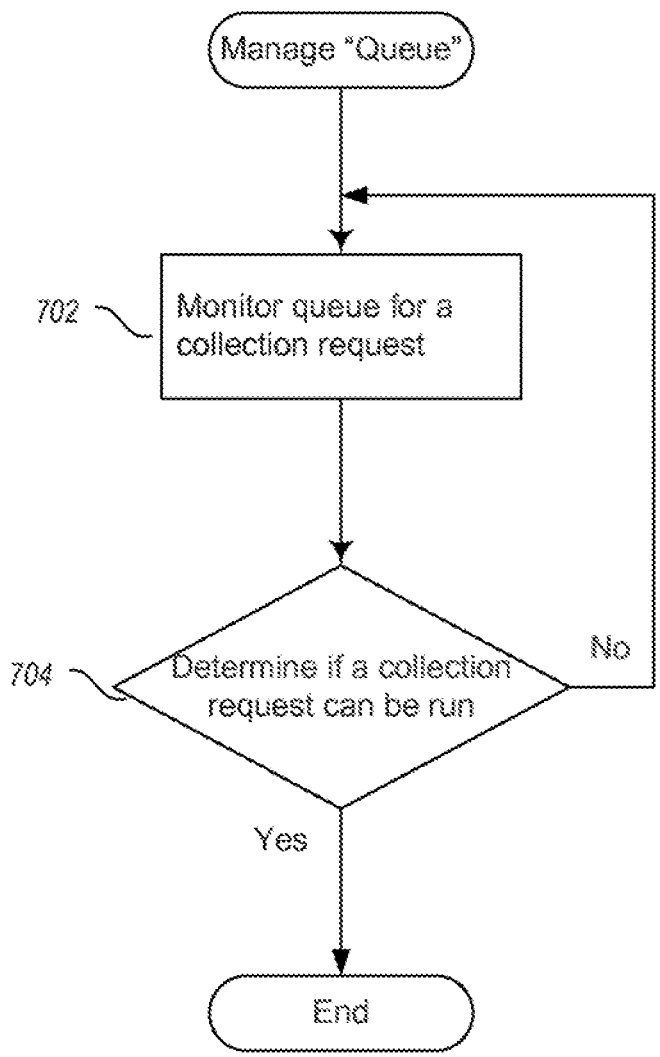
FIG. 7 is an example flow diagram of example queue management logic provided by an example embodiment of a Social Intelligence System.

FIG. 7 is an example flow diagram of example queue management logic provided by an example embodiment of a Social Intelligence System. In particular, FIG. 7 illustrates a process that may be implemented by, for example, one or more elements of the Social Intelligence System 114, such as the Collection Request queue 202 or the collection engine 204 as described with reference to FIG. 3. The process provides a collection request to the collection engine for searching.

The illustrated process begins at block 702, where the queue or any equivalent data structure for storing and processing requests, is monitored for a collection request. Typically, at least one collection request or collection request will be in the queue to be searched. However, even if there is a collection request in the queue, it may not be the case that the request can be run due to its associate collection time period or other requirements.

At block 704, it is determined whether a collection request can be run. In some embodiments, a collection request can be run if an associated collection time period has elapsed. For example, a collection request is run every 60 seconds and that time period has elapsed. In other embodiments the associated collection time period may be specified as a "no earlier" time, a time interval, a frequency, a maximum time, a clock time, an absolute time and/or a relative time. If there is a collection request available, when the collection request can run, then the collection request is sent to the collection engine 204 as described with reference to FIG. 3, and the process ends. Otherwise the process continues to loop back to block 702 to monitoring the queue for a collection request.

Some embodiments perform one or more operations/aspects in addition to, or instead of, the ones described with reference to the process of FIG. 7. For example, in one embodiment, the collection engine may pull all of the collection requests from the queue and return them to the queue if the associated collection time has not yet elapsed.

Figure 8:
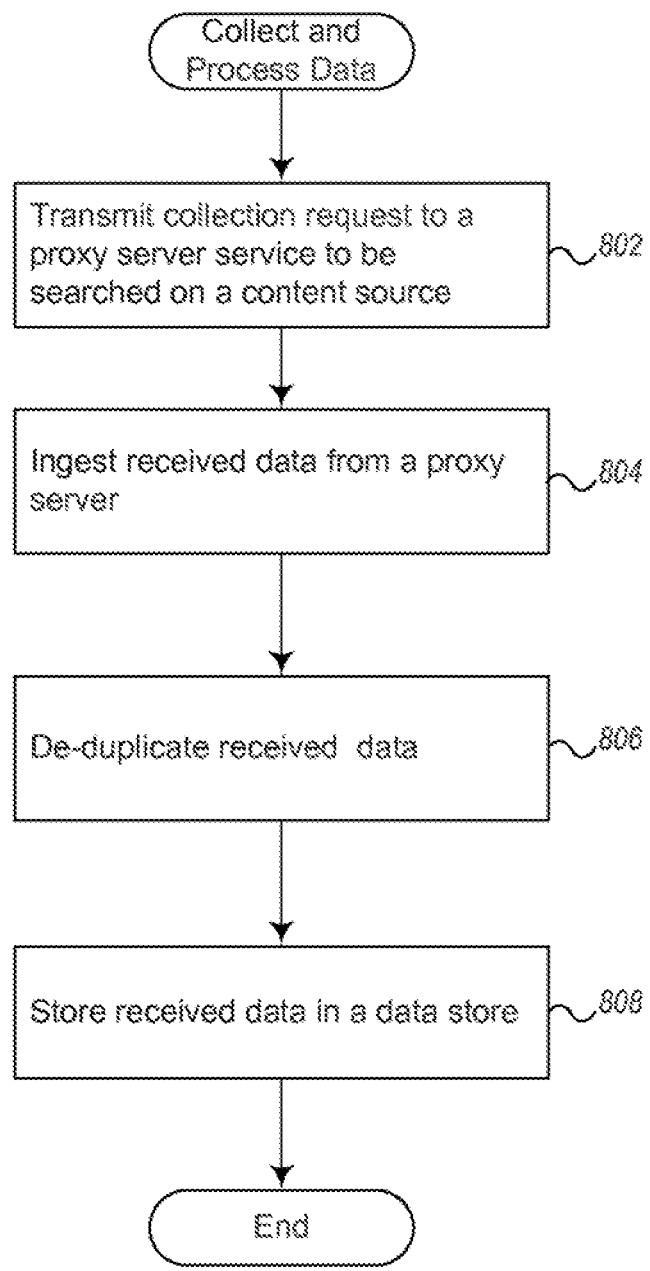
FIG. 8 is an example flow diagram of example data collecting and processing logic provided by an example embodiment of a Social Intelligence System.

FIG. 8 is an example flow diagram of example data collecting and processing logic provided by an example embodiment of a Social Intelligence System. In particular, FIG. 8 illustrates a process that may be implemented by, for example one or more elements of the Social Intelligence System 114, such as the collection engine 204 or the ingestion engine 204 as described with reference to FIG. 3. The process provides a collection request to a proxy server service, another computer system, or directly to the content source to search for content and ingests the received content into a data store.

The illustrated process begins at block 802, when a collection request is transmitted to a proxy server to enable the collection request to be searched on a content source. The collection request is sent to a proxy server service or third party content source by the collection engine 204, as described with reference to FIG. 3. Generally once received by the proxy server service, the proxy server service searches using one of a plurality of machines having an IP address preferably different than previous searches of that content source, thereby masking the identity of the true searcher of a piece of content. Advantageously having access to a content source through a proxy allows a content source to be searched by multiple IP addresses and thus not blocking a single or small number of IP addresses access for a specific or some time period. In some embodiments, a particular proxy server service is selected based on a particular geographic location or time of day. In other embodiments, it is the proxy server service that determines the proper proxy server for use.

At block 804, collected data is ingested from the proxy server, computing system, or directly from a content source. The ingestion of the content may be accomplished using the ingestion engine 206 as described with reference to FIG. 3. At block 806, the collected data is optionally de-duplicated. Known de-duplication algorithms may be incorporated in the SIS. De-duplication could occur before or after ingestion. De-duplication is a process whereby duplicated data is removed or made inaccessible. Duplicates may be determined based on a permalink, author, time and or content. Duplicates may be removed to ensure that space is not wasted in a data store. In addition, when de-duplication is utilized by the system, the SIS, can also ensure that an associated collection time period is optimized for a particular collection request. At block 208, the ingested and de-duplicated data may be stored in a data store, for example the data store 208 as described with reference to FIG. 3.

After block 806 the process continues other processing and/or ends.

Figure 9:
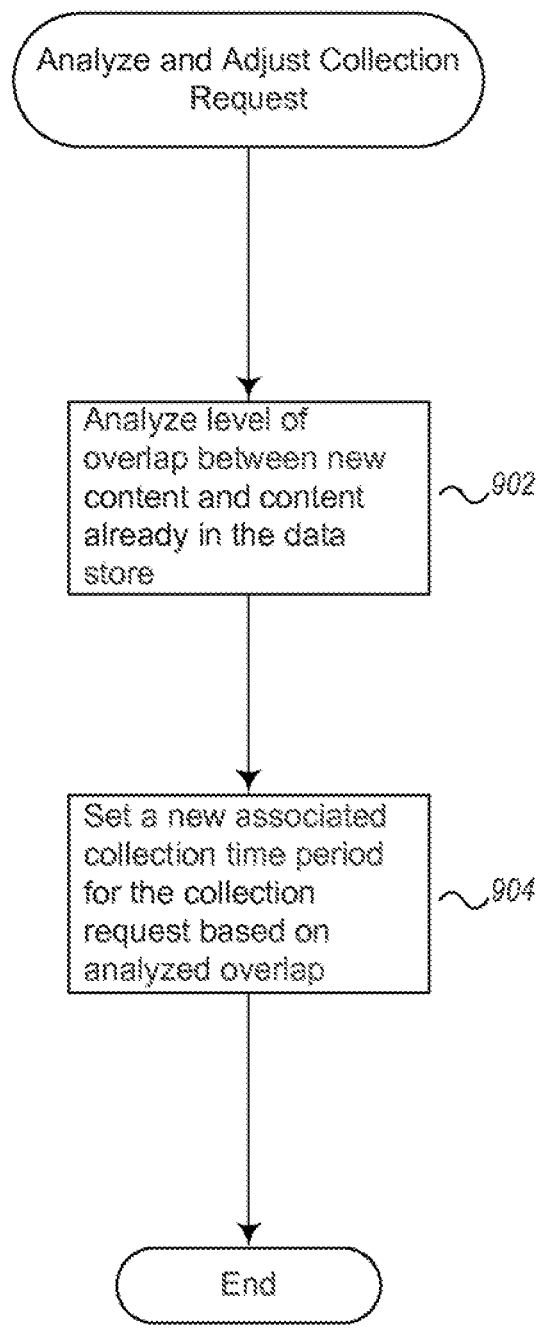
FIG. 9 is an example flow diagram of example collection request analyzing and adjusting logic provided by an example embodiment of a Social Intelligence System.

FIG. 9 is an example flow diagram of example collection request analyzing and adjusting logic provided by an example embodiment of a Social Intelligence System. In particular, FIG. 9 illustrates a process that may be implemented by, for example, one or more elements of the Social Intelligence System 114, such as the data collection analyzer 210 and the data collection adjuster 212 as described with reference to FIG. 3. The process determines an associated collection time period for a collection request and allows for the time period to be dynamically adjusted.

The illustrated process begins at block 902 where a level of overlap or a duplication rate between received content and content already stored in the data store is analyzed. When new content is received, either during collection, ingestion, de-duplication or storage, a duplication rate or overlap rate is determined. In order to determine a duplication rate (amount of exact content duplicates) or an overlap rate (amount of closely related content) many different algorithms may be used such as a hash of the content, a comparison of time, dates, permalinks, authors and/or the like. De-duplication algorithms are not required when determining a duplication rate. (Duplicate date may be detected.) This duplication rate signifies the amount of the newly received content that is already in the data store (hence duplicated). For example, after a search has retrieved 10 posts, if 8 were already in the data store this duplication rate is 80%. The determination of the duplication rate may be calculated by the ingestion engine 206, the data store 208, or by the data collection analyzer 210 sampling data from the data store as described with reference to FIG. 3.

At block 904, a new associated collection time period is set for that particular collection request based on the analyzed duplication rate. Using the duplication rate, a matrix or other table, such as the one shown with reference to FIG. 10, may be used to determine a new collection time period for the collection request. If the duplication rate is high, then the collection request will run less frequently and the associated collection time period will be longer. If the duplication rate is low, then the collection request will run more frequently and the associated collection time period will be shorter. In some cases, the collection rate will not change. Once determined, the associated collection time period is stored and/or associated with the collection request in the Collection Request queue 202 as described with reference to FIG. 3.

After block 904 the process continues with other processing and/or ends.

Figure 10:
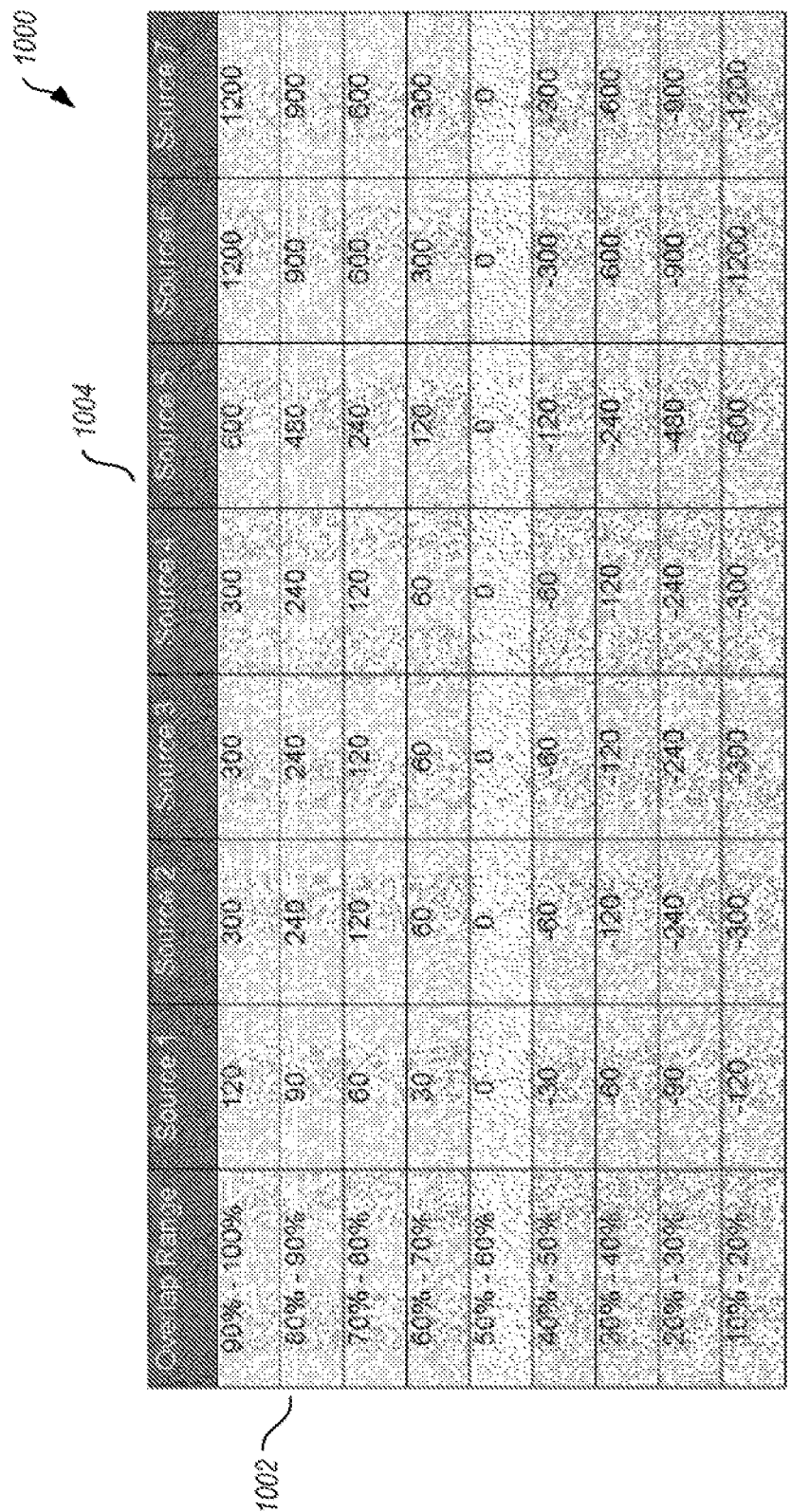
FIG. 10 is an example matrix showing an example overlap and time value table used to adjust the collection time of a collection request.

FIG. 10 is an example matrix showing an example overlap and time value table used to adjust the collection time of a collection request. The example matrix or lookup table 1000 includes a duplicate or overlap rate defined by a percentage 1002 along the y axis with a list of content sources 1004 along the x axis. Based on a duplication rate, a value (in seconds in this example) is either added or subtracted from a current associated collection time period. In other embodiments, table 1000 may contain absolute or relative times, intervals, frequencies, clock times, or min/max times. Table 1000 is one example of a matrix; however other data structures and/or matrices may be built to take into account time of day, location, difference in overlap rate between searches, and the like to alter the associated time period in other ways. In addition, although illustrated as a table, other equivalent techniques (such as a function that returns a value given an overlap value and an indication of source) may be incorporated.

From the foregoing it will be appreciated that, although specific embodiments have been described herein for purposes of illustration, various modifications may be made without deviating from the spirit and scope of this disclosure. For example, the methods, techniques, and systems for content recommendation are applicable to other architectures. Also, the methods, techniques, and systems discussed herein are applicable to differing query languages, protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A computer implemented method for retrieving social media content from at least one content source over a network, the method comprising the steps of:
    collecting a first content sample from the at least one content source;
    after a first collection time interval of a first length, collecting a second content sample from the at least one content source;
    comparing the first and second samples to determine a quantity of content common to the first and second samples;
    determining, based upon the determined quantity of content common to the first and second samples, a second collection time interval of a second length different from the first length; and
    after the second collection time interval, collecting a third content sample from the at least one content source.

2. The method of claim 1, wherein the difference between the first length and the second length is proportional to the determined quantity of content common to the first and second samples.

3. The method of claim 1, further comprising receiving a request for content including an indication of desired content and an indication of at least one content source.

4. The method of claim 3, further comprising generating a collection request based on an interface of the indicated at least one content source.

5. The method of claim 4, further comprising storing the generated collection request and associated collection time interval associated with the collection request within a data structure.

6. The method of claim 1 wherein the first collection time interval is an indication of at least one of a clock time, an interval, absolute time, relative time, and a frequency.

7. The method of claim 1 wherein the determining a second collection time interval further comprises setting at least one of a minimum time period and a maximum time period.

8. The method of claim 1 wherein the comparing the first and second samples to determine a quantity of content common to the first and second samples further comprises comparing duplication of permalinks, time, date and/or author.

9. The method of claim 1, further comprising determining a proxy server service for a collection request based on at least one of an associated collection time interval, a received indication of a desired geographic location to be searched, a cost of the proxy server service and a quantity of searches conducted by the proxy server service.

10. The method of claim 1, further comprising transmitting a collection request to at least one third party content service to collect content when an associated collection time interval of the collection request has elapsed.

11. The method of claim 1 wherein the first collection time interval is based on a predetermined matrix of overlap values and prior collection time intervals.

12. A computing system configured to gather social media content, comprising:
- a memory;
- a content collection and ingestion system, stored in the memory and configured, when executed on a computer processor, to communicate with one or more computing systems over a network, collect a first content sample from the at least one content source, and, after a first collection time interval of a first length, collect a second content sample from the at least one content source; and
- a content collection determination engine, stored in the memory, and configured, when executed on a computer processor, to compare the first and second samples to determine a quantity of content common to the first and second samples, and, determine, based upon the determined quantity of content common to the first and second samples, a second collection time interval of a second length different from the first length, the content collection and ingestion system further configured to collect a third content sample from the at least one content source after the second collection time interval.

13. The computing system of claim 12 wherein the content collection and ingestion system further comprises a Collection Request queue, stored in the memory and configured, when accessed by the content collection and ingestion system, to provide a pending collection request based on the second collection time interval.

14. The computing system of claim 13 wherein the content collection and ingestion system further comprises a collection engine, stored in the memory and configured, when executed on a computer processor, to manage a provided collection request from the Collection Request queue based on the second collection time interval.

15. The computing system of claim 13 wherein the content collection determination engine is further configured to determine the quantity of content common to the first and second samples by comparing permalinks, time, date and/or author.

16. The computing system of claim 12 wherein the one or more computing systems comprise at least one of proxy server services and third party content providers.

17. The computing system of claim 16 wherein the content collection determination engine further comprises a data collection adjuster, stored in the memory and configured, when executed on a computer processor, to determine the proxy server service for the received collection request based on the time value, a received indication of a desired location to be searched, a cost of the proxy server service and/or a quantity of searches conducted by the proxy server service.

18. A non-transitory computer readable medium whose contents, when executed, cause a computing system to retrieve social media content from at least one content source over a network by performing a method comprising:
- collecting a first content sample from the at least one content source;
- after a first collection time interval of a first length, collecting a second content sample from the at least one content source;
- comparing the first and second samples to determine a quantity of content common to the first and second samples;
- determining, based upon the determined quantity of content common to the first and second samples, a second collection time interval of a second length different from the first length; and
- after the second collection time interval, collecting a third content sample from the at least one content source.

19. The computer-readable medium of claim 18 wherein the computer-readable medium is a memory in a computing device.

20. The computer-readable medium of claim 19 wherein the contents are instructions that when executed cause a computing system to perform the method.

* * * * *